United States Patent
Shimizu et al.

[11] Patent Number: 6,102,151
[45] Date of Patent: Aug. 15, 2000

[54] ELECTRIC POWER STEERING APPARATUS

[75] Inventors: Yasuo Shimizu; Shigenori Takimoto, both of Wako, Japan

[73] Assignee: Honda Giken Kogyo Kabushiki Kaisha, Tokyo, Japan

[21] Appl. No.: 09/113,930

[22] Filed: Jul. 10, 1998

[30] Foreign Application Priority Data

Jul. 24, 1997 [JP] Japan ........................... 9-198988

[51] Int. Cl.⁷ ................................................ B62D 4/04
[52] U.S. Cl. ........................ 180/446; 180/443; 701/41; 701/42
[58] Field of Search ................ 701/41, 42; 180/443, 180/444, 446

[56] References Cited

U.S. PATENT DOCUMENTS

| | | | |
|---|---|---|---|
| 4,890,683 | 1/1990 | Matsuda et al. | 180/446 |
| 5,265,019 | 11/1993 | Harara et al. | 701/41 |
| 5,423,391 | 6/1995 | Shimizu | 180/446 |
| 5,887,675 | 3/1999 | Hackl et al. | 180/422 |
| 5,996,724 | 12/1999 | Shimizu et al. | 180/446 |

FOREIGN PATENT DOCUMENTS

| | | |
|---|---|---|
| 0 596 167 | 5/1994 | European Pat. Off. . |
| 4-9708 | 2/1992 | Japan . |
| 7-257406 | 10/1995 | Japan . |

*Primary Examiner*—Daniel G. DePumpo
*Attorney, Agent, or Firm*—Merchant & Gould P.C.

[57] ABSTRACT

Variable gear ratio mechanism variably sets a ratio defining a pivot angle of steered wheels of the vehicle to a steering angle of a steering wheel of the vehicle. Electric motor applies an electric steering assist to the steering system of the vehicle. Steering torque sensor detects steering torque in the steering system. Control unit sets a target motor current on the basis of at least the steering torque detected by the steering torque sensor. Gear ratio detector detects the gear ratio set by the variable gear ratio mechanism. Thus, the control unit sets the target motor current on the basis of the gear ratio detected by the gear ratio detector in addition to the steering torque detected by the steering torque sensor. With this arrangement, the target motor current set by the control unit can reflect the currently-set gear ratio, with the result that the operating characteristics of the vehicle's steering system can be changed smoothly and continuously in response to every gear ratio change and an improved steering feel free of unsmoothness and friction is achieved.

1 Claim, 12 Drawing Sheets

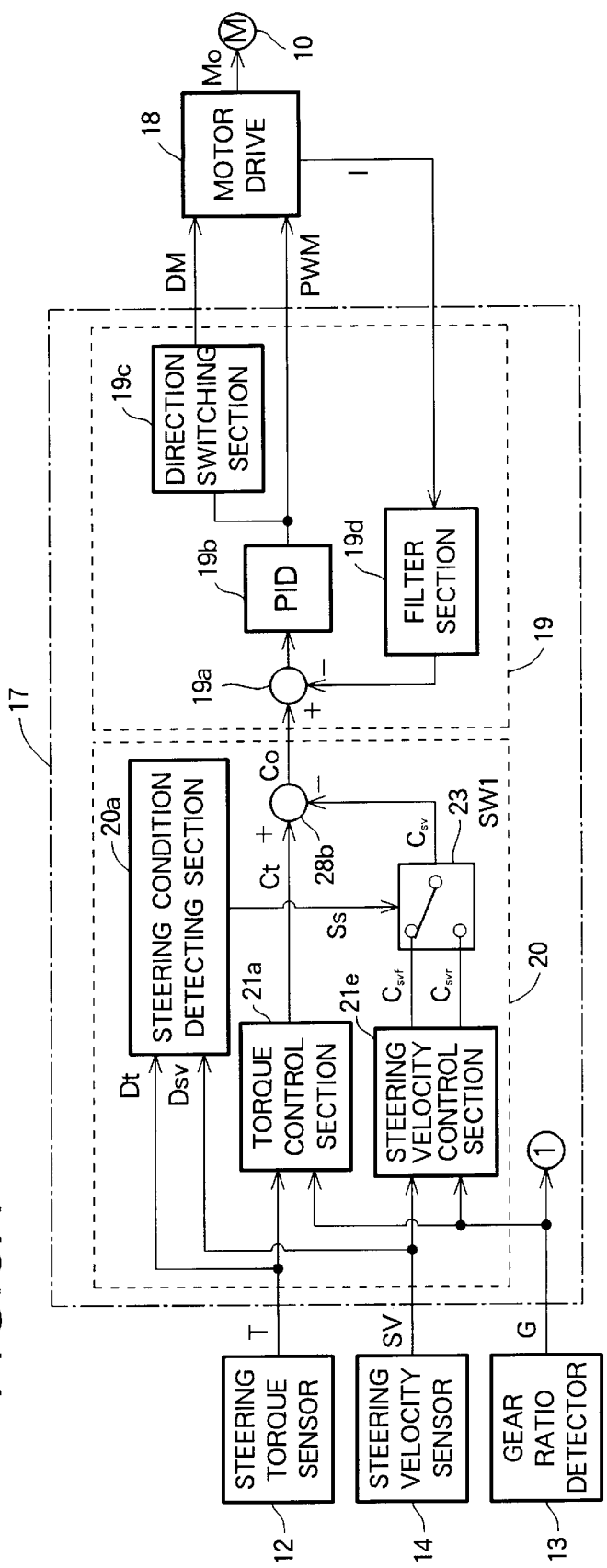
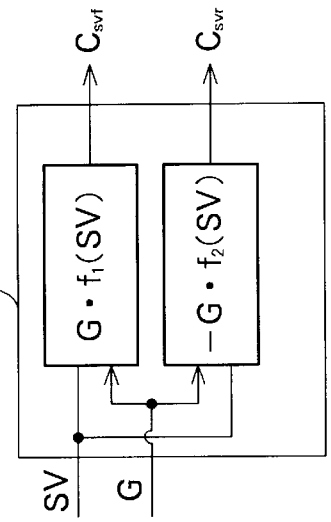
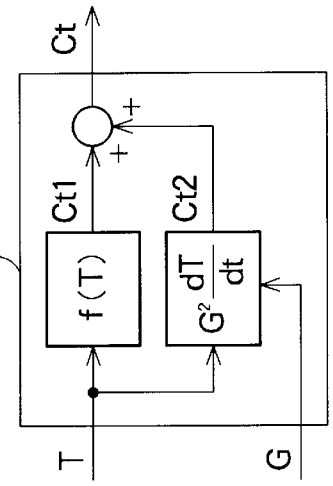
FIG.3A
FIG.3B
FIG.3C

TABLE A

TABLE B

TABLE C

TABLE D

TABLE E

TABLE F

FIG.13
| | Dd | Dt | Dsv | TORQUE MODIFICATION DIRECTION | CONTROL MODE | STEERING CONDITION |
|---|---|---|---|---|---|---|
| RIGHT + | + | + | +/− | | A | OUTWARD |
| | + | − | + | + | C | RETURN |
| | + | − | − | − | B | RETURN |
| LEFT − | − | − | −/+ | | A | OUTWARD |
| | − | + | − | − | C | RETURN |
| | − | + | + | + | B | RETURN |
FIG.14A
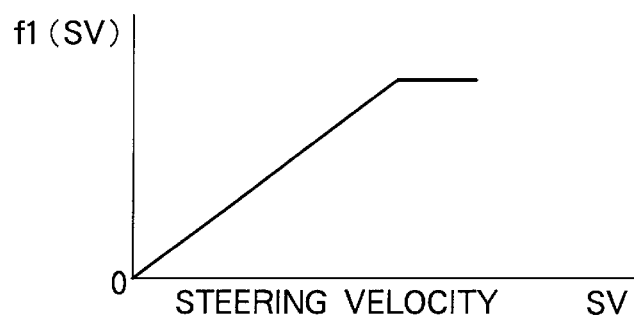
FIG.14B
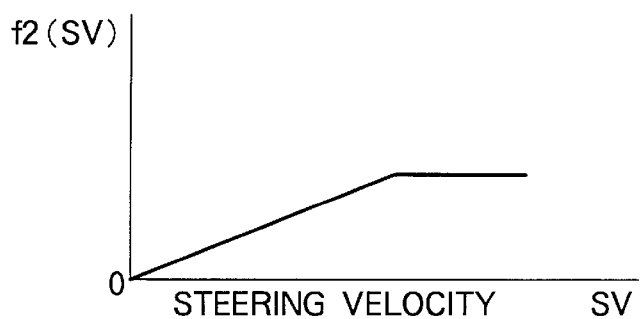

ELECTRIC POWER STEERING APPARATUS

BACKGROUND OF THE INVENTION

1. Field of the Invention

The present invention relates generally to electric power steering apparatuses equipped with a so-called "variable gear ratio mechanism". More particularly, the present invention concerns an improvement electric power steering apparatus with a variable gear ratio mechanism, which is arranged to impart a sufficient return motion—toward the center or straight-ahead position—of the steering wheel and thereby effectively minimizes the feeling of unsmoothness, uncontinuousness and friction that would be encountered as the vehicle driver turns the steering wheel, without sacrificing advantageous steering-assist characteristics, and which thus achieves an improved steering feel and stable vehicle behavior during both low-speed and high-speed driving.

2. Description of the Related Art

Electric power steering apparatuses have been known which, using a variable gear ratio mechanism, such as a worm sector, ball nut or rack-and-pinion type, are designed to set a larger gear ratio when the steering wheel is at or near the straight-ahead position and set a smaller gear ratio when the steering wheel is at or near the full lock position, so as to provide an enhanced vehicle response. Also, electric power steering apparatuses have been commonly known which control an electric assisting motor to reduce its electric steering assist as the vehicle travels faster. Such known electric power steering apparatuses are arranged to minimize undesirable variations in the vehicle's behavior, by reducing the rotational speed setting of the motor during a driver's return steering operation in accordance with an increase in the vehicle velocity; that is, the returning speed of the vehicle's steering system is kept relatively high during low-speed driving and relatively low during high-speed driving (slow response during low-speed driving and quick response during high-speed driving).

Further, the known electric power steering apparatuses equipped with a variable gear ratio mechanism are constructed to avoid an increase in the number of steering wheel revolutions by setting a small overall steering ratio, because a relatively great overall steering ratio would lead to an increased number of steering wheel revolutions even though it does reduce steering effort by the vehicle driver.

In addition, because of the above-mentioned arrangement that a larger gear ratio is set when the steering wheel is at or near the straight-ahead position while a smaller gear ratio is set when the steering wheel is at or near the full lock position, i.e., that the gear ratio is decreased as the steering angle increases, the steering wheel movement is given some operational margin to prevent too quick a directional change of the steered wheels during straight-ahead vehicle travel while reducing the number of lock-to-lock revolutions of the motor. However, this arrangement would result in the following disadvantages.

First, because influences of mechanical friction, viscosity and inertia of oil, etc., appearing in upstream regions, from the variable gear ratio mechanism up to the steering wheel, of the steering system, tend to differ depending on the gear ratio selected, the returning speed of the steering wheel would also vary in accordance with the selected gear ratio irrespective of self-returning torque from the vehicle wheels. This inconvenience would be serious particularly during low-speed driving because the self-returning torque is smaller than during high-speed driving. Second, even when a steering assist is applied to outward (away from the center position toward one of the full lock positions) and return motions of the steering wheel by positively utilizing output power from the electric motor, it is difficult to impart a suitable steering assist due to gear ratio changes by the variable gear ratio mechanism; this would unavoidably involve the feeling of unsmoothness, uncontinuousness and friction, thereby resulting in a deteriorated steering feel.

SUMMARY OF THE INVENTION

It is therefore an object of the present invention to provide an electric power steering apparatus with a variable gear ratio mechanism which permits a constantly suitable return motion of the steering wheel and achieves a good steering feel, irrespective of gear ratio changes by the mechanism as well as influences of mechanical friction and viscosity and inertia of oil.

To accomplish the above-mentioned object, the present invention provides an electric power steering apparatus for use with an automotive vehicle which comprises: a variable gear ratio mechanism for variably setting a gear ratio defining a pivot angle of steered wheels of the vehicle to a steering angle of a steering wheel; an electric motor for applying an electric steering assist to a steering system of the vehicle; a steering torque sensor for detecting steering torque in the steering system; a control unit for setting a target motor current on the basis of at least the steering torque detected by the steering torque sensor; a motor drive for driving the motor on the basis of the target motor current set by the control unit; and a gear ratio detector for detecting the gear ratio set by the variable gear ratio mechanism. The control unit sets the target motor current on the basis of the gear ratio detected by the gear ratio detector in addition to the the steering torque detected by the steering torque sensor.

With the arrangement that the gear ratio detector detects a gear ratio currently set by the variable gear ratio mechanism and the control unit sets a target motor current on the basis of steering torque detected by the steering torque sensor and a currently-set gear ratio detected by the gear ratio detector, the target motor current set by the control unit can reflect the currently-set gear ratio, with the result that the present invention can always change the operating characteristics of the vehicle's steering system smoothly and continuously, in response to every gear ratio change and effectively achieves an improved steering feel free of unsmoothness and friction.

BRIEF DESCRIPTION OF THE DRAWINGS

The above and other objects and advantages of the present invention will become apparent from the following detailed description of the preferred embodiments when read in conjunction with the accompanying drawings, in which:

FIGS. 3A to 3C are block diagrams showing various electrical components of the electric power steering apparatus in accordance with a first embodiment of the present invention;

FIG. 13 is a table showing exemplary torque modification directions in outward and return steering conditions; and FIGS. 14A and 14B are tables showing exemplary characteristics of functions f1(SV) and f2(SV) of FIG. 3.

DETAILED DESCRIPTION OF THE PREFERRED EMBODIMENTS

Figure 1:
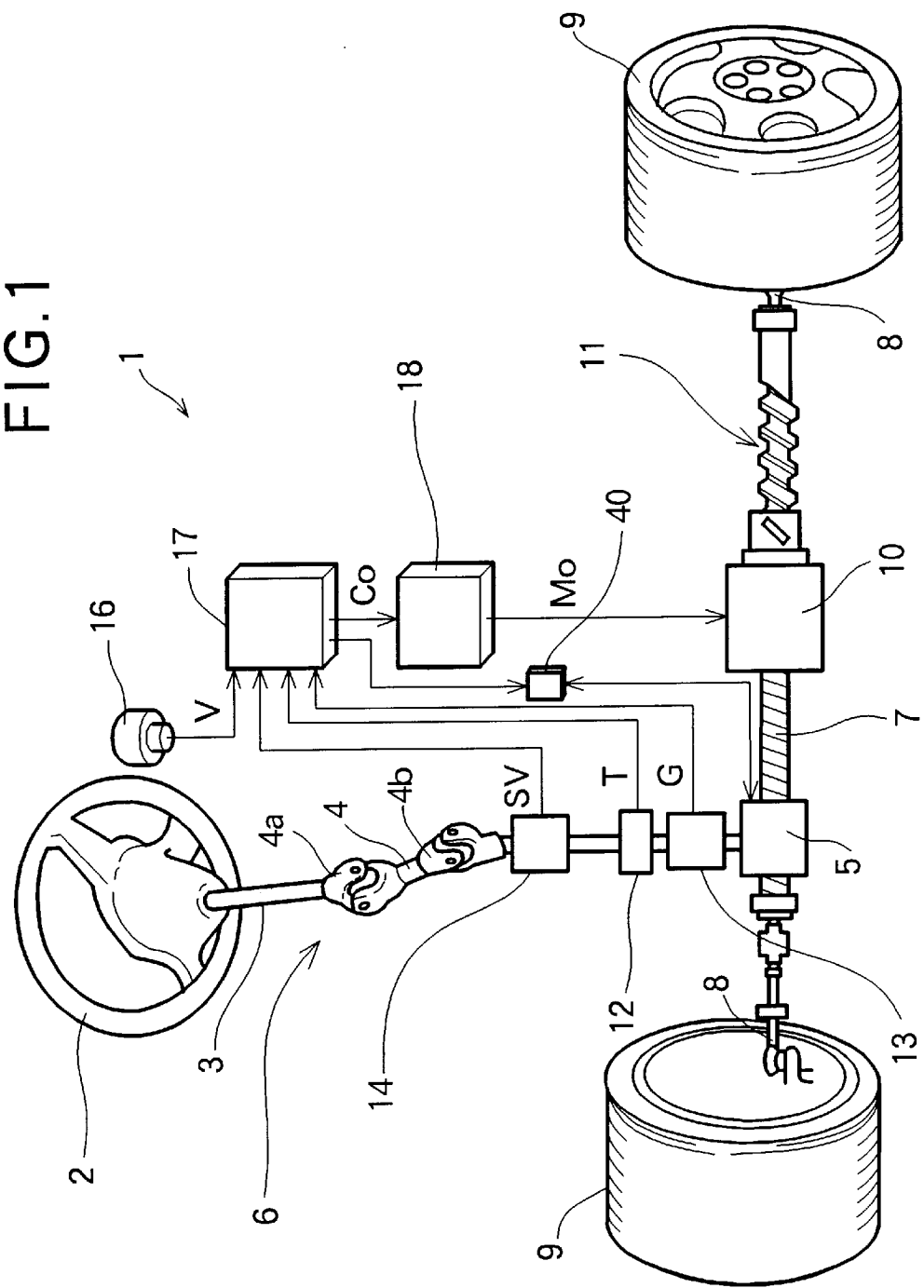
FIG. 1 is a diagram showing an exemplary overall arrangement of an electric power steering apparatus according to the present invention.

FIG. 1 is a block diagram showing an exemplary overall setup of an electric power steering apparatus for use with an automotive vehicle according to the present invention. The electric power steering apparatus 1 comprises a manual steering power generation unit 6, which includes a steering shaft 3 that is integrally connected at one end to a steering wheel 2 and connected at the other end, via a connecting shaft 4 having universal joints 4a and 4b, to a variable gear ratio mechanism 5 enclosed within a steering gear box. The variable gear ratio mechanism 5 may be of the same construction as disclosed in Japanese Patent Laid-open Publication No. HEI-7-257406. Rack-and-pinion steering set equipped with the variable gear ratio mechanism 5 converts rotary movements of the steering shaft 3 into linear reciprocating movements of a toothed rack shaft 7 that is connected to steered left and right front wheels 9 via tie rods 8. Thus, in response to driver's steering operation via the wheel 2, the left and right front wheels 9 are pivoted to change the travelling direction of the automotive vehicle through the rack-and-pinion type manual steering power generation unit 6, which is designed to set a larger gear ratio when the steering wheel is at or near the straight-ahead position and set a smaller gear ratio when the steering wheel is at or near the full lock position as will be described hereinbelow.

To reduce the driver's steering effort to be manually applied via the manual steering power generation unit 6, an electric assisting motor 10 and ball thread mechanism 11 are provided coaxially with the rack shaft 7, so that an electric steering assist from the motor 10 is converted via the mechanism 11 into thrust acting on the rack shaft 7.

The steering gear box also contains a steering torque sensor 12 for detecting manually-applied torque, a gear ratio detector 13, and a steering velocity sensor 14 for detecting a steering velocity corresponding to a rotating speed of the steering shaft 3, which generate and feed a torque signal T, gear ratio signal G and steering velocity signal SV, respectively, to an electronic control unit 17. The electric power steering apparatus of the invention further includes a vehicle velocity sensor 16 for detecting a velocity of the automotive vehicle, which generates and feeds a vehicle velocity signal V to the control unit 17.

In the illustrated example, the steering torque sensor 12 comprises a potentiometer for transforming torsion of a torsion bar, corresponding to a change in operating angle of the steering wheel, into voltage, and the gear ratio detector 13 comprises a cam connected with the variable gear and a potentiometer. Further, the steering velocity sensor 14 comprises a dc motor such as a tacho-generator, and the vehicle velocity sensor 16 comprises a combination of a slitted rotating disk and a photo coupler. Thus, the steering torque sensor 12 outputs a torque signal T corresponding to a direction and amount of steering torque applied by the vehicle driver, the gear ratio detector 13 outputs a gear ratio signal G corresponding to a currently-set gear ratio, the steering velocity sensor 14 outputs a steering velocity signal SV corresponding to a direction and velocity of the driver's steering operation, and the vehicle velocity sensor 16 outputs a vehicle velocity signal V corresponding to a direction and velocity of the vehicle travel.

Via a motor drive 18, the electronic control unit 17 drives the motor 10, in accordance with the known PWM (Pulse With Modulation) scheme, on the basis of a motor control signal (e.g., PWM signal) Co that is obtained by processing the torque signal T from the steering torque sensor 12, gear ratio signal G from the gear ratio detector 13, steering velocity signal SV from the steering velocity sensor 14 and vehicle velocity signal V from the vehicle velocity sensor 16, so as to give an electric steering assist corresponding to a current traveling condition of the vehicle. In the illustrated example, the motor drive 18 comprises an interface circuit 18a and a bridge circuit made up of four FETs.

Figure 2:
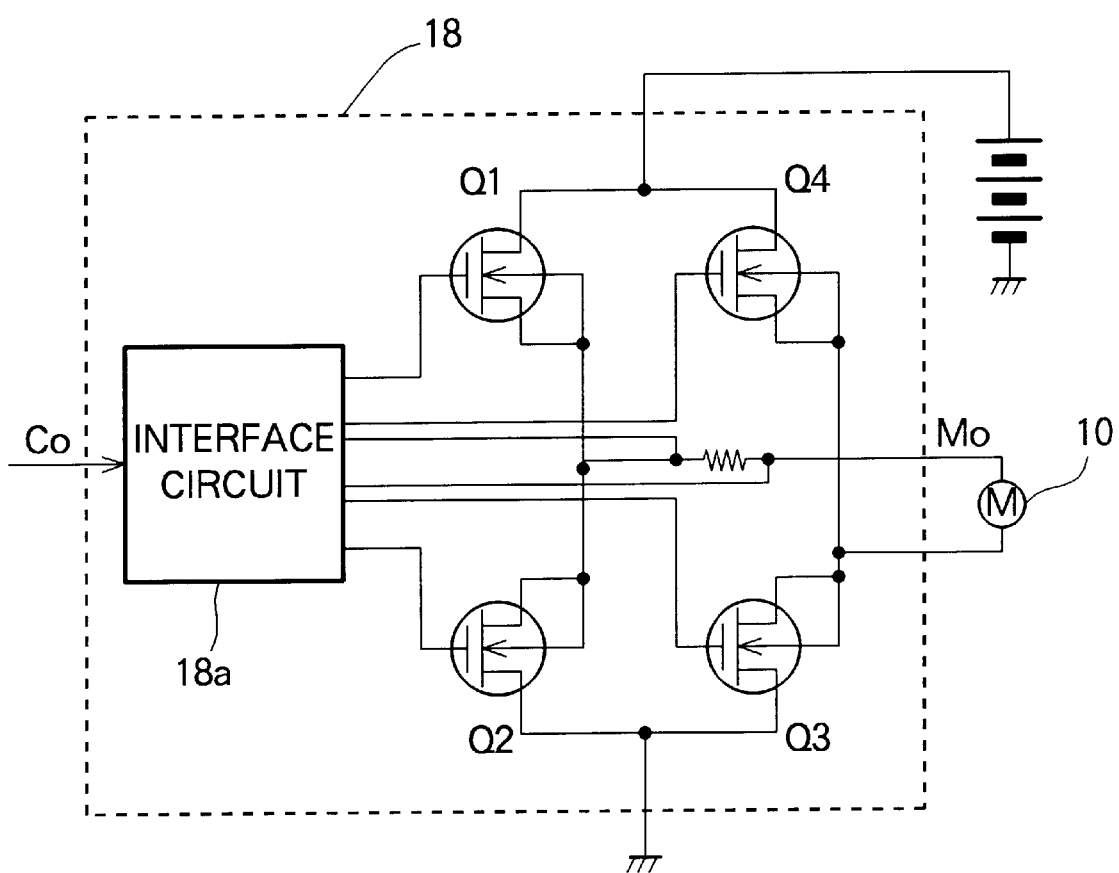
FIG. 2 is a block diagram showing an exemplary detailed construction of a motor drive in the electric power steering apparatus of FIG. 1.

FIG. 2 is a block diagram showing an exemplary detailed construction of the motor drive 18 comprising the FET bridge circuit, which generates a motor drive signal Mo on the basis of the motor control signal Co input to the interface circuit 18a. The motor control signal Co input to the interface circuit 18a contains, for example, a direction signal for controlling the rotational direction of the motor 10 and a PWM signal for controlling the torque and the number of revolutions of the motor 10. Specifically, when the motor 10 is to be rotated in the counterclockwise direction, the motor drive 18 turns ON the FET Q4 by the direction signal and controls the gate of the FET Q2 by a duty factor of the PWM signal, but when the motor 10 is to be rotated in the clockwise direction, the motor drive 18 turns ON the FET Q1 by the direction signal and controls the gate of the FET Q3 by a duty factor of the PWM signal. By simultaneously turning ON the FETs Q1 and Q4, or Q2 and Q3 to short-circuit the plus and negative input terminals of the motor 10, the motor 10 can be controlled to be electromagnetically braked. Further, a low resistance is connected between the FET bridge and the motor 10 so that a current flowing through the motor and operating conditions (e.g., presence of malfunction) of the FETs and motor 10) can be detected from detected potential across the resistance.

FIG. 3A is a block diagram showing principal electrical components of the electric power steering apparatus according to a first embodiment of the present invention, which are used to control the motor control signal on the basis of detected steering torque and velocity and gear ratio in a manner as described below.

As shown in FIG. 3A, the control unit 17, preferably implemented by a microprocessor, includes a target steering-signal generator section 20 and a feedback control section 19. The target steering-signal generator section 20 is arranged to generate a torque control amount (i.e., target torque value) Ct on the basis of absolute values of the torque signal T from the steering torque sensor 12 and the gear ratio signal G from the gear ratio sensor 13. The target steering-signal generator section 20 also generates a rotational velocity control amount $C_{svf}$, $C_{svr}$ corresponding to the steering velocity signal SV from the steering velocity sensor 14 and the gear ratio signal G. When the steering wheel 2 is turned outward away from the center or straight-ahead position (outward motion of the steering wheel 2) as determined from the direction signals of the torque and steering velocity signals T and SV, the target steering-signal generator section 20 supplies the feedback control section 19 with a motor control signal Co (Ct−$C_{svf}$). On the other hand, when the steering wheel 2 is turned toward the straight-ahead position (return motion of the steering wheel 2) as determined from the direction signals of the torque and steering velocity signals T and SV, the target steering-signal generator section 20 supplies the feedback control section 19 with a motor control signal Co (Ct+$C_{svr}$).

Although not specifically shown, the control unit 17 further includes an A/D converter and a direction determining section, so as to generate digital values, corresponding to absolute values of the torque signal T from the steering torque sensor 12 and the steering velocity signal SV from the steering velocity sensor 14, to serve as direction flags Dt and Dsv, respectively.

The feedback control section 19 includes an adder 19a, a PID (Proportional, Integral and Derivative) control section 19b, a direction switching section 19c and a filter section 19d, so that current I is fed back to modify the motor control signal Co to be suitable for the motor drive 18 to drive the motor 10; for example, the motor control signal Co is applied to the motor drive 18 after being converted to a PWM signal and a rotational direction signal Dm.

Steering condition detecting section 20a detects an outward or return motion of the steering wheel 2 on the basis of the direction flag Dt associated with the torque signal T and the direction flag Dsv associated with the steering velocity signal SV. Thus, the steering condition detecting section 20a supplies a selector switch 23 provided at a stage following steering velocity control section 21e with a steering condition detection signal Ss representing a detected condition of the steering wheel motion, for example, a high (H)-level steering condition detection signal Ss for the outward motion of the steering wheel and a low (L)-level steering condition detection signal Ss for the return motion. Note that such detection of the outward or return motion of the steering wheel 2 may be made on the basis of the respective signs of the direction flags Dt and Dsv. That is, when the signs of the flags Dt and Dsv agree with each other (Dt=Dsv), the motion of the steering wheel may be judged to be "outward"; otherwise (Dt≠Dsv), the motion of the steering wheel may be judged to be "return".

Figure 8:
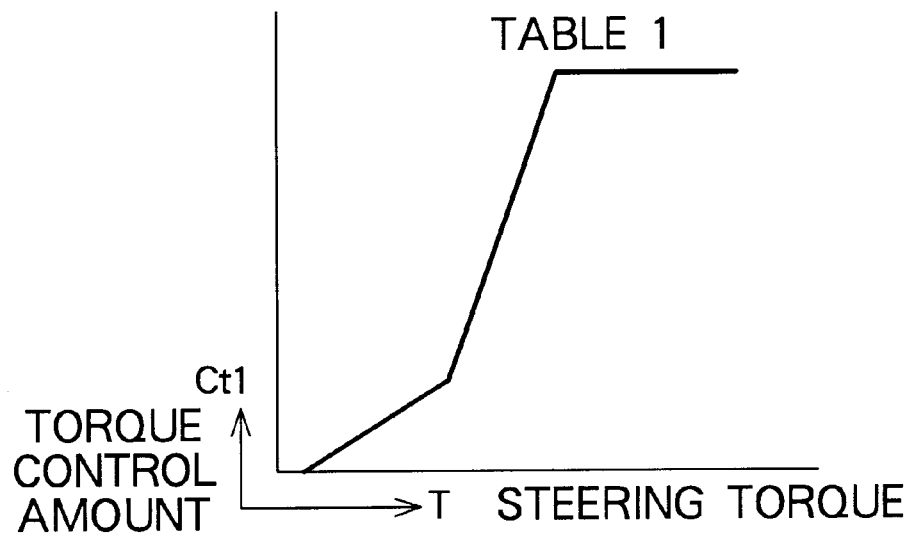
FIG. 8 is a table showing exemplary relationship between steering torque and motor torque control amount in the second embodiment.

Torque control section 21a includes a memory, such as a ROM, where there are prestored various torque control amounts Ct1 corresponding to possible values of steering torque signal T, as shown in "TABLE 1" of FIG. 8, acquired through experiments or logical operations. Thus, the torque control section 21a selects a particular torque control amount Ct1, from among those prestored in the table, corresponding to a digitally-converted value of the input torque signal T and outputs it as a motor torque control amount signal Ct1, as shown in FIG. 3B. As further shown in FIG. 3B, the torque control section 21a differentiates the torque signal T to obtain a differentiated value dT/dt and multiplies the value dT/dt by the square of the gear ratio G to yield a motor torque control amount signal Ct2, so that a sum Ct of the two signals Ct1 and Ct2 is fed to an adder 28b.

The steering velocity control section 21e includes a memory, where there are prestored various motor-rotation-velocity control amounts Csv as functions f1(SV) and f2(SV) in association with both the outward motion and the return motion of the steering wheel 2. Depending on a digitally-converted value of the input steering velocity signal SV, the steering velocity control section 21e multiplies the motor-rotation-velocity control amounts f1(SV) and f2(SV) by the gear ratio G directly or after suitable modification thereof. Thus, the steering velocity control section 21e supplies the following selector switch 23 with a signal $C_{svf}$ (=G·f1(SV)) or $C_{svr}$ (=−G·f2(SV)) depending on the steering condition detection signal Ss from the steering condition detecting section 20a; that is, the signal $C_{svf}$ is supplied when an outward motion of the steering wheel is detected, while the signal $C_{svr}$ is supplied when a return motion of the steering wheel is detected. The functions f1(SV) and f2(SV) have characteristics as shown in FIGS. 14A and 14B, respectively.

Figure 4:
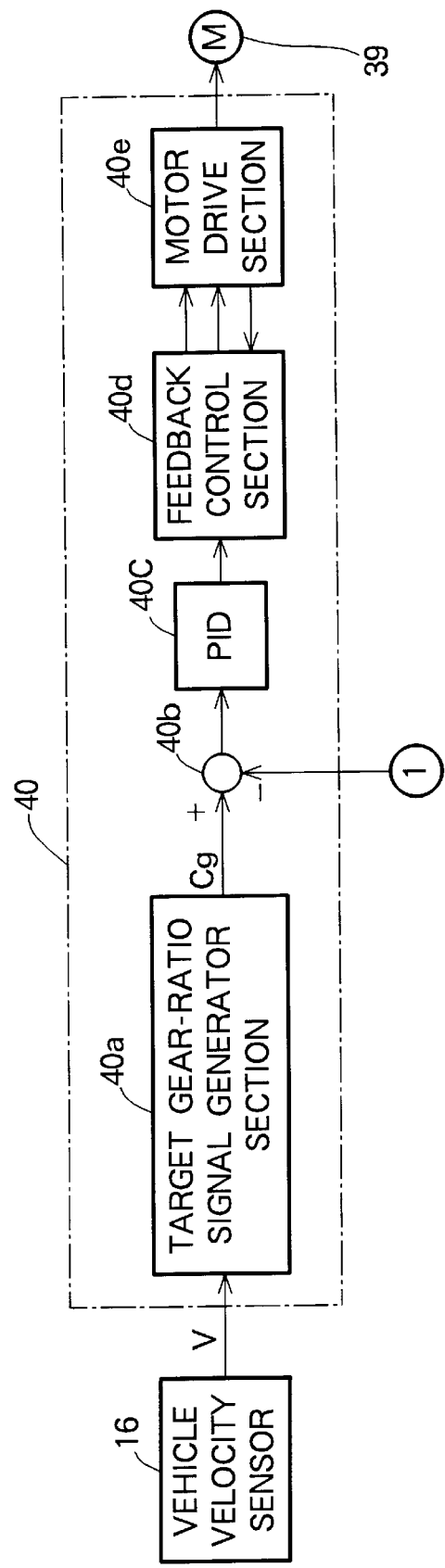
FIG. 4 is a block diagram showing an exemplary detailed construction of a gear ratio control in the first embodiment.

As shown in FIG. 4, a gear ratio control 40 of the variable gear ratio mechanism 5 includes a target gear-ratio signal generator section 40a, an adder 40b, a PID control section 40c, a feedback control section 40d and a motor drive section 40e.

Figure 9:
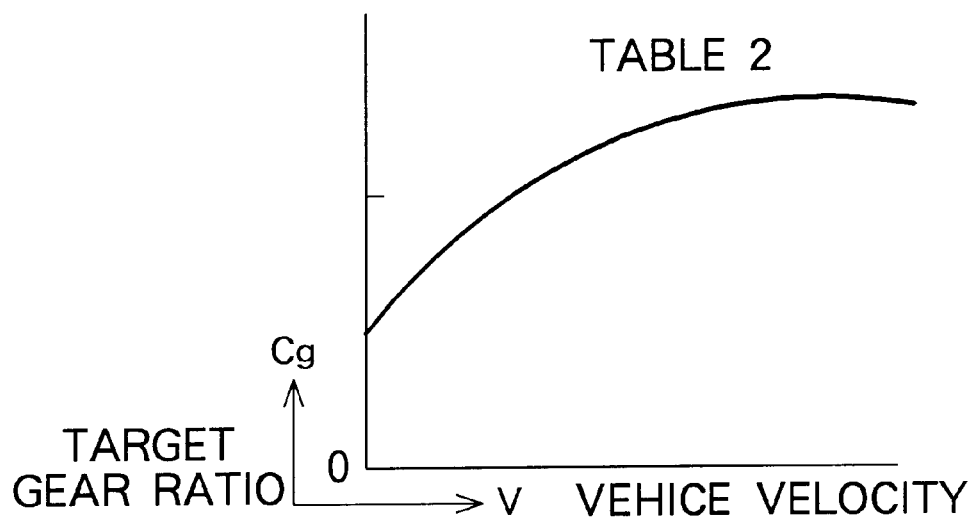
FIG. 9 is a table showing exemplary relationship between vehicle velocity and target gear ratio in the second embodiment.

The target gear-ratio signal generator section 40a includes a memory, such as a ROM, where there are prestored various target gear-ratio values Cg corresponding to possible values of vehicle velocity V, as shown in "TABLE 2" of FIG. 9, acquired through experiments or logical operations. Thus, the target gear-ratio signal generator section 40 selects a particular target gear-ratio value Cg, from among those prestored in the table, corresponding to a digitally-converted value of the input vehicle velocity V and outputs it as a gear ratio control signal Cg, as shown in FIG. 4. Then, with the gear ratio control signal Cg, a motor 39 of the variable gear ratio mechanism 5 is controlled by the feedback control section 40d and motor drive section 40e by way of the adder 40b and PID control section 40c so as to eliminate an offset between the gear ratio signal G and the gear ratio control signal Cg.

In this manner, the control unit 17 generates a motor control signal Co by calculating a difference between a torque control amount Ct containing a value corresponding to the square of a gear ratio signal G and a rotational velocity control amount $C_{sv}$ obtained by multiplying the steering velocity control amounts by the gear ratio signal G directly or after suitable modification. With this arrangement, it is possible to avoid deterioration or unsmoothness in the return motion of the steering wheel and feeling of delay in effecting the outward motion of the steering wheel that would be presented by variations in mechanical friction and viscosity and inertia of oil due to gear ratio changes responsive to changing vehicle velocities. In addition, the arrangement can avoid unsmoothness and uncontinuousness of the steering operation, to thereby achieve an enhanced steering feel.

Figure 5:
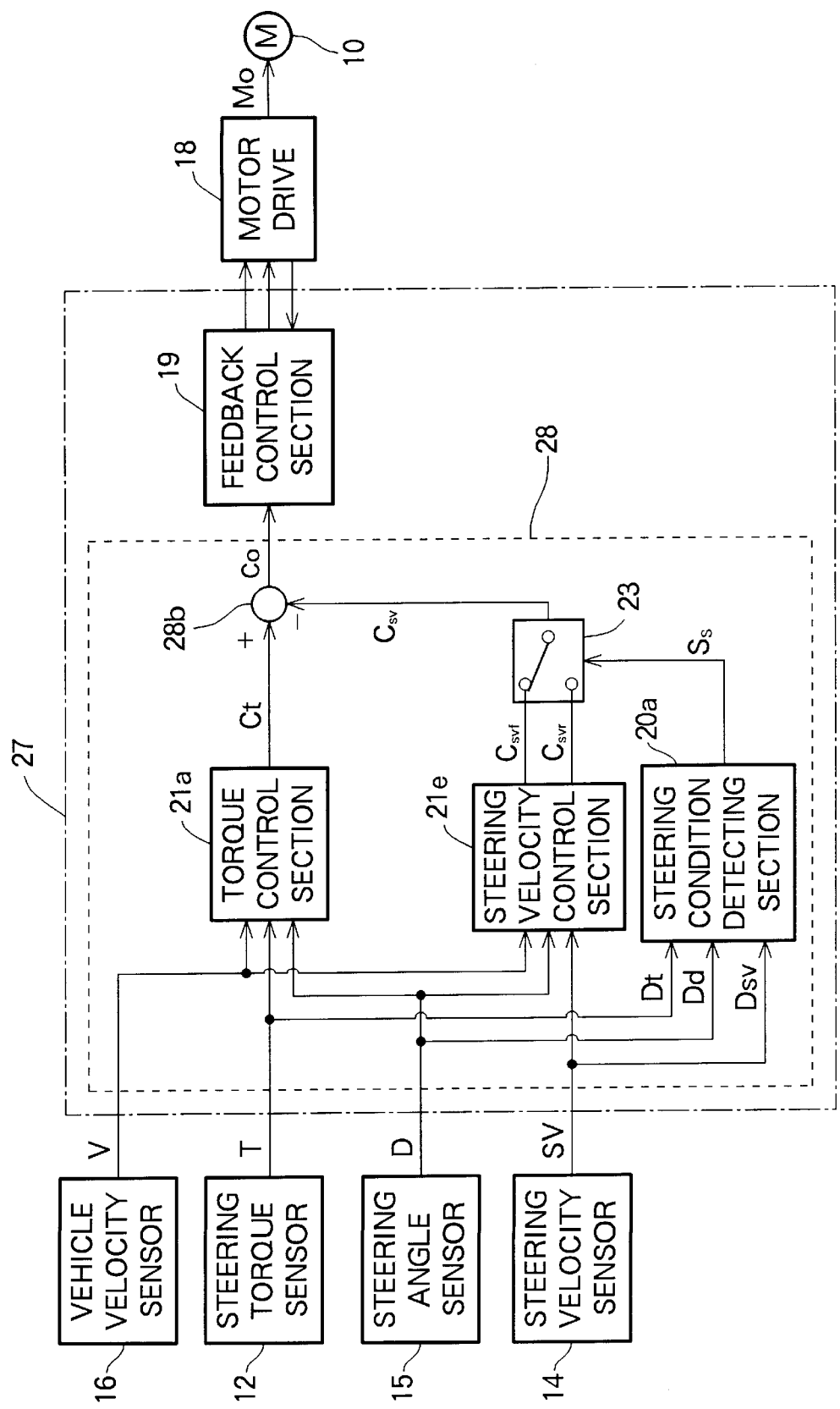
FIG. 5 is a block diagram showing various electrical components of an electric power steering apparatus in accordance with a second embodiment of the present invention.

FIG. 5 is a block diagram showing principal electrical components of an electric power steering apparatus in accordance with a second embodiment of the present invention, where the same reference characters as in FIG. 3A represent the same components. As shown, the second embodiment is generally similar to the first embodiment of FIG. 3A except that it includes a steering angle sensor 15 in place of the gear ratio detector 13 of the first embodiment.

In the second embodiment, the steering torque sensor 12 comprises a potentiometer for transforming torsion of the torsion bar, corresponding to a change in torque of the steering wheel, into voltage, and the steering velocity sensor 14 comprises a dc motor such as a tacho-generator. The steering angle sensor 15 and vehicle velocity sensor 16 comprises a combination of slitted rotating disk and a photo coupler, and the motor drive 18 comprises an FET bridge circuit similarly to that shown in FIG. 2.

In the second embodiment, an electronic control unit 27, corresponding to the control unit 17 of the first embodiment and preferably implemented by a microprocessor, includes a target steering-signal generator section 28 and a feedback control section 19. The target steering-signal generator section 28 is arranged to generate a torque control amount Ct, corresponding to a torque signal T from the steering torque sensor 12, on the basis of the torque signal T, a vehicle velocity signal V from the vehicle velocity sensor 16 and a steering angle signal D from the steering angle sensor 15. The target steering-signal generator section 28 also generates a steering velocity control amount $C_{sv}$ ($C_{svf}$ or $C_{svr}$), corresponding to a steering velocity signal SV from the steering velocity sensor 14, on the basis of the vehicle velocity signal V and the steering angle signal D. When an outward motion of the steering wheel 2 is detected from the directions of the torque signal T, steering angle signal D and steering velocity signal SV, the target steering-signal generator section 28 calculates a difference between the torque control amount Ct corresponding to the torque signal T and the steering velocity control amount Cv corresponding to the steering velocity signal SV and supplies the feedback control section 19 with the thus-calculated difference (Ct–$C_{SV}$) as a motor control signal Co.

Although not specifically shown, the control unit 27 further includes an A/D converter and a direction determining section, so as to generate digital values, corresponding to absolute values of the torque signal T from the steering torque sensor 12, the steering angle signal D from the steering angle sensor 15 and the steering velocity signal SV from the steering velocity sensor 14, to serve as direction flags Dt, Dd and Dsv, respectively.

Further, the target steering-signal generator section 28 includes a steering condition detecting section 20a, a torque control section 21a and a steering velocity control section 21e. The torque control section 21a outputs a particular torque control amount Ct selected from among those acquired through experiments or logical operations and stored in a memory. The steering velocity control section 21e multiplies steering velocity control amounts for outward and return motions of the steering wheel by the gear ratio signal G directly or after suitable modification, to thereby yield steering velocity control amounts $C_{svf}$ and $C_{svr}$. Thus, in response to an output signal Ss from the steering condition detecting section 20a, the target steering-signal generator section 28 outputs a target outward-motion signal (Ct–$C_{svf}$) and a target return-motion signal (Ct+$C_{svr}$).

More specifically, the steering condition detecting section 20a detects an outward or return motion of the steering wheel 2 on the basis of the direction flag Dt associated with the torque signal T (hereinafter "torque direction flag"), direction flag Dd associated with the steering angle signal D (hereinafter "steering-angle direction flag") and the direction flag Dsv associated with the steering velocity signal SV (hereinafter "steering-velocity direction flag"), in a manner as shown in a table of FIG. 13. Thus, the steering condition detecting section 20a supplies the selector switch 23 a steering condition detection signal Ss corresponding to the detected direction of the steering wheel motion, for example, a high (H)-level steering condition detection signal Ss for the outward motion and a low (L)-level steering condition detection signal Ss for the return motion.

Figure 6:
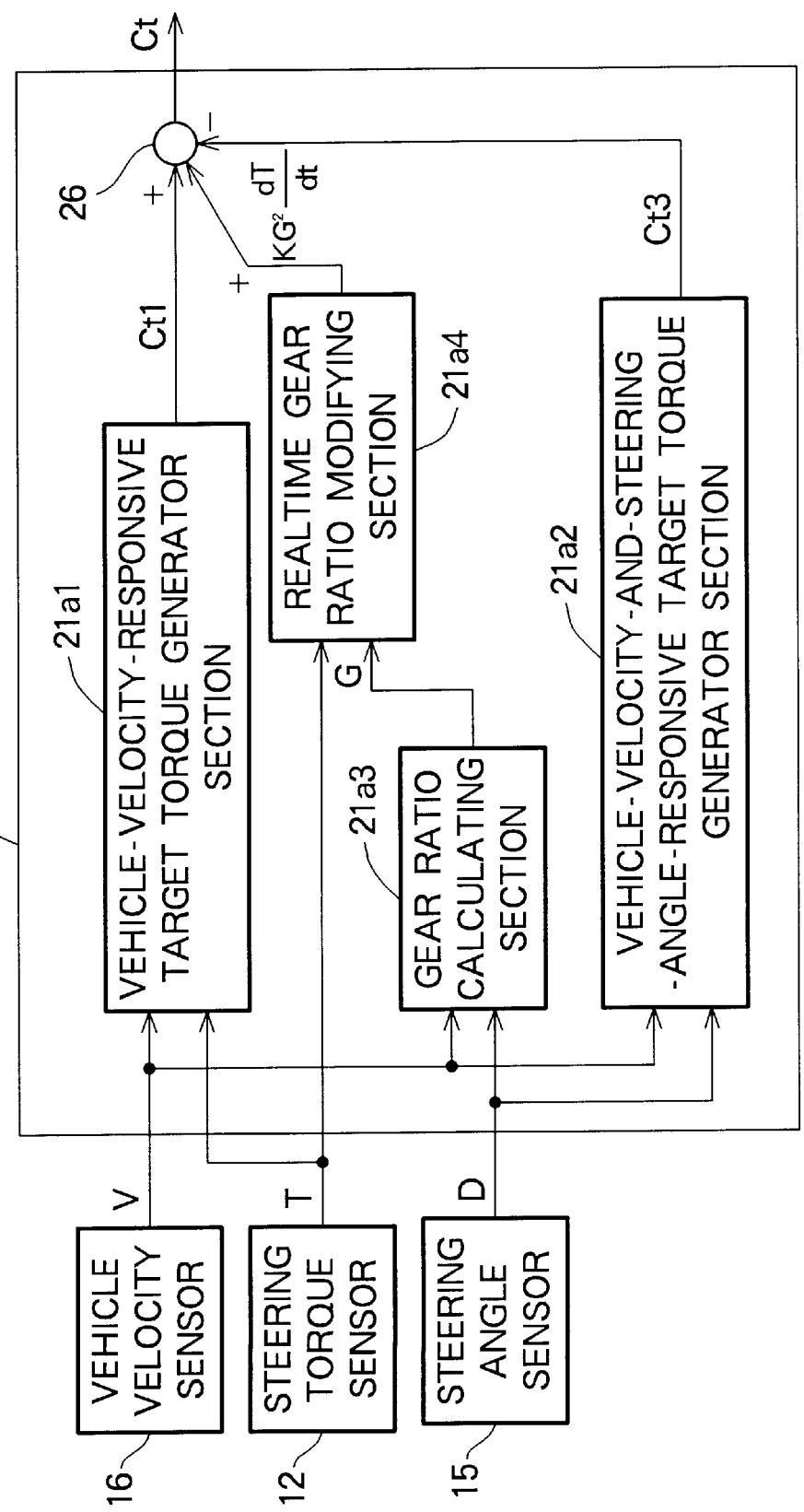
FIG. 6 is a block diagram showing an exemplary detailed construction of a torque control section in the second embodiment of FIG. 5.

FIG. 6 is a block diagram showing details of the torque control section 21a, which includes a vehicle-velocity-responsive target torque generator section 21a1, a vehicle-velocity-and-steering-angle-responsive target torque generator section 21a2, a gear ratio calculating section 21a3, a realtime gear-ratio modifying section 21a4, and an adder section 26, to calculate a torque control amount Ct.

Figure 11A:
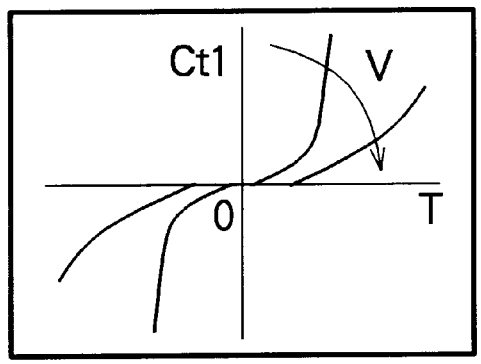
FIGS. 11A to 11C are tables showing exemplary control characteristics of the torque control section in the second embodiment.

More specifically, the vehicle-velocity-responsive target torque generator section 21a1 includes a memory, such as a ROM, where there are prestored various motor torque control amounts Ct1, corresponding to possible values of torque signal T and vehicle velocity V, as shown in "TABLE A" of FIG. 11A, acquired through experiments or logical operations. Thus, this vehicle-velocity-responsive target torque generator section 21a1 selects and outputs a particular motor torque control amount Ct1, from among those prestored in the table, corresponding to digitally-converted values of the input torque signal T and vehicle velocity signal V. According to TABLE A of FIG. 11A, the curve representing the motor torque control amounts Ct1 will shift to another curve in an arrowed direction as the vehicle velocity V increases.

Figure 11B:
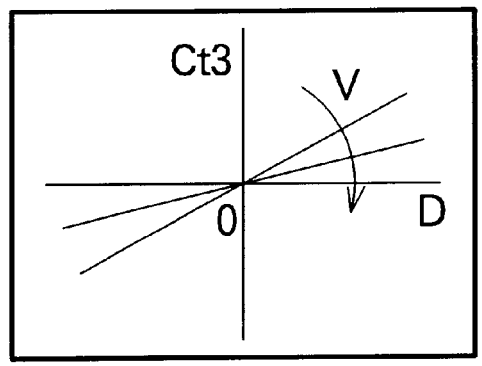

The vehicle-velocity-and-steering-angle-responsive target torque generator section 21a2 includes a memory, such as a ROM, where there are prestored various motor torque control amounts Ct3, corresponding to possible values (signs) of the steering-angle direction flag Dd, absolute value of steering angle Cd and vehicle velocity V, as shown in "TABLE B" of FIG. 11B, acquired through experiments or logical operations. Thus, this vehicle-velocity-and-steering-angle-responsive target torque generator section 21a2 selects and outputs a particular motor torque control amount Ct3, from among those prestored in the table, corresponding to digitally-converted values of the input steering angle sinal D and vehicle velocity signal V. According to TABLE B of FIG. 11B, the curve representing the motor torque control amounts Ct3 will shift to another curve in an arrowed direction as the vehicle velocity V increases.

Figure 11C:
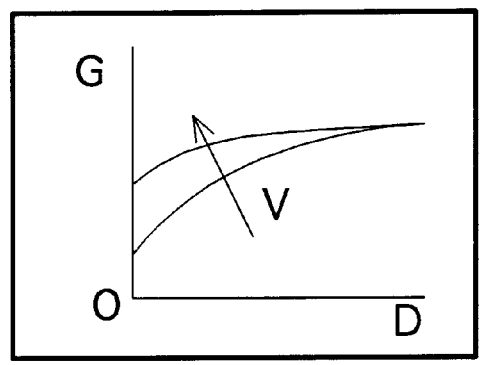

The gear ratio calculating section 21a3 includes a memory, such as a ROM, where there are prestored various gear ratios G, corresponding to possible values of steering angle signal D and vehicle velocity V, as shown in "TABLE C" of FIG. 11C, acquired through experiments or logical operations. Thus, on the basis of the steering angle signal D and vehicle velocity V input from the respective sensors, this gear ratio calculating section 21a3 calculates a gear ratio G sequentially varying in response to the changing steering angle vehicle velocity. According to TABLE C of FIG. 11C, the curve representing the gear ratios G will shift to another curve in an arrowed direction as the vehicle velocity V increases.

The realtime gear-ratio modifying section 21a4 differentiates the torque signal T received from the steering torque sensor 12 and then multiplies the differentiated value (dT/dt) by a coefficient "k" and the square of the gear ratio G calculated by the gear ratio calculating section 21a3, to thereby output a modified gear ratio "$KG^2 dT/dt$".

The adder 26 adds together the motor torque control amount Ct1 and modified gear ratio "$KG^2 dT/dt$" applied to its plus (+) input and the motor torque control amount Ct3 applied to its minus (–) input, to thereby yield a motor torque control amount Ct; that is, the motor torque control amount Ct is given by the adder 26 calculating a difference between a sum of the motor torque control amount Ct1 and modified gear ratio "KG $^2$dT/dt" and the motor torque control amount Ct3.

Figure 7:
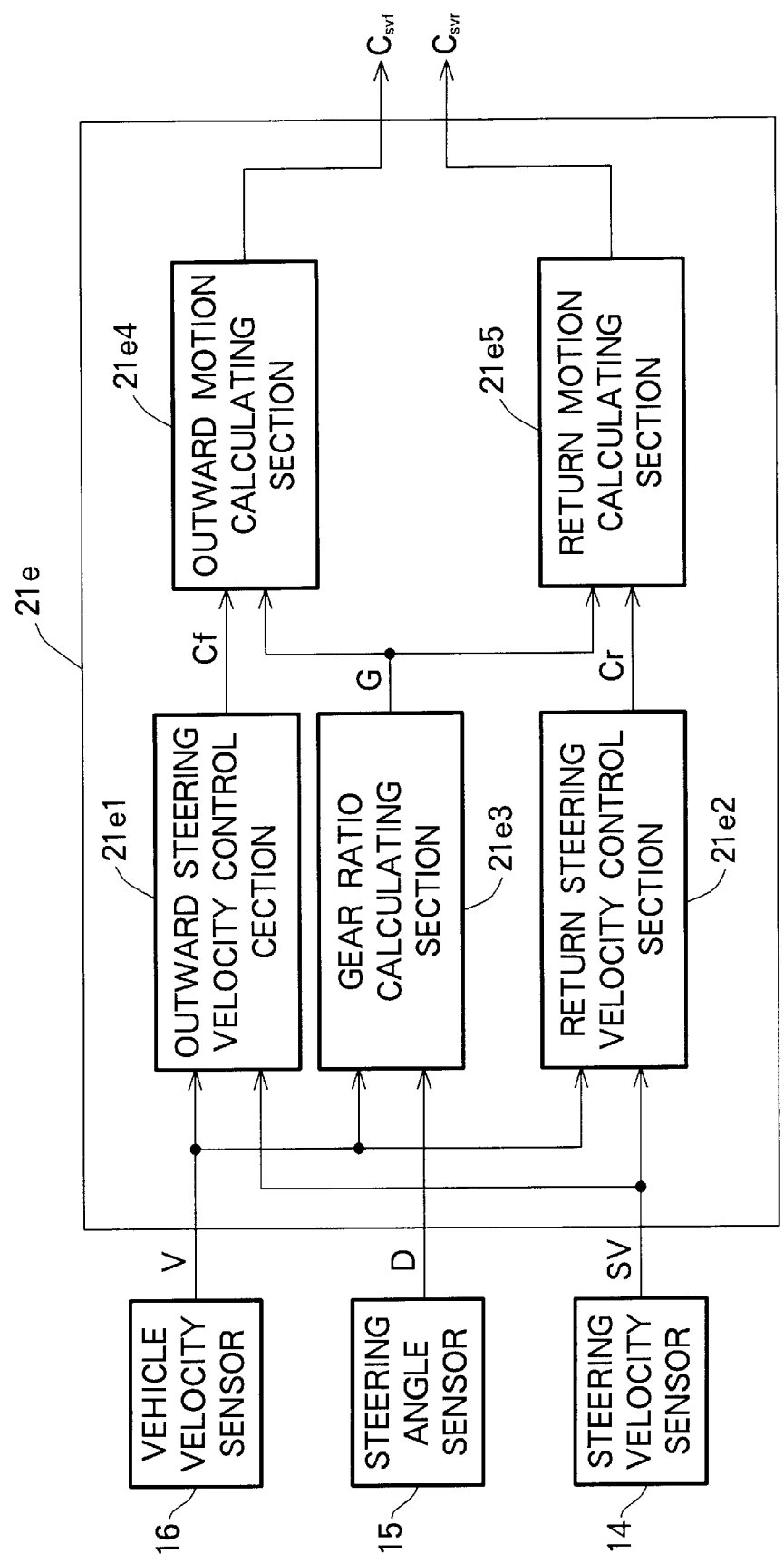
FIG. 7 is a block diagram showing details of a steering velocity control section in the second embodiment.

FIG. 7 is a block diagram showing details of the steering velocity control section 21e, which includes an outward steering velocity control section 21e1, a return steering velocity control section 21e2, a gear ratio calculating section 21e3, an outward motion calculating section 21e4 and a return motion calculating section 21e5.

On the basis of th e signals D, SV and V from the steering angle sensor 15, steering velocity sensor 14 and vehicle velocity sensor 16, the steering velocity control section 21e selectively reads out a corresponding outward steering velocity control amount, return steering velocity control amount and gear ratio from respective tables and multiplies the outward and return steering velocity values by the gear ratio signal G, directly or after suitable modification thereof, to thereby determine steering velocity control amounts $C_{svf}$ and $C_{svr}$.

Figure 12A:
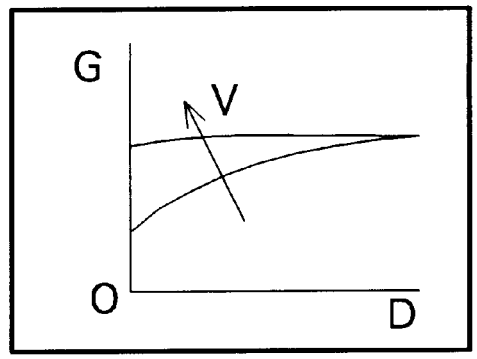
FIGS. 12A to 12C are tables showing exemplary control characteristics of the steering velocity control section in the second embodiment.
Figure 12B:
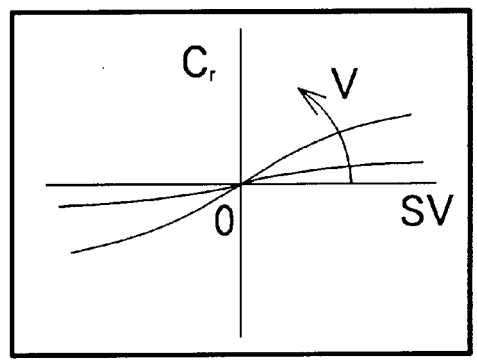
Figure 12C:
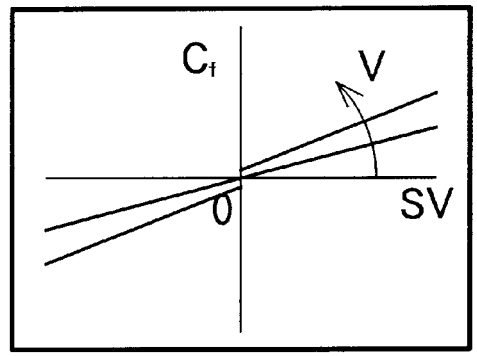

The outward steering velocity control section 21e1 includes a memory, such as a ROM, where there are prestored various outward steering velocity control amounts Cf, corresponding to possible values of steering velocity signal SV and vehicle velocity V, as shown in "TABLE F" of FIG. 12C, acquired through experiments or logical operations. Thus, this outward steering velocity control section 21e1 selects and outputs a particular outward steering velocity control amount Cf, from among those prestored in the table, corresponding to the input steering velocity signal SV and vehicle velocity signal V. According to TABLE F of FIG. 12C, the curve representing the outward steering velocity control amounts Cf will shift to another curve in an arrowed direction as the vehicle velocity V increases.

Similarly, the return steering velocity control section 21e2 includes a memory, such as a ROM, where there are prestored various return steering velocity control amounts Cr, corresponding to possible values of steering velocity signal SV and vehicle velocity V, as shown in "TABLE E" of FIG. 12B, acquired through experiments or logical operations. Thus, this return steering velocity control section 21e2 selects and outputs a particular return steering velocity control amount Cr, from among those prestored in the table, corresponding to the input steering velocity signal SV and vehicle velocity signal V. According to TABLE E of FIG. 12B, the curve representing the return steering velocity control amounts Cr will shift to another curve in an arrowed direction as the vehicle velocity V increases.

The gear ratio calculating section 21e3 includes a memory, such as a ROM, where there are prestored various gear ratios G, corresponding to possible values of steering angle signal D and vehicle velocity V, as shown in "TABLE D" of FIG. 12A, acquired through experiments or logical operations. Thus, this gear ratio calculating section 21e3 selects and outputs a particular gear ratio G, from among those prestored in the table, corresponding to the input steering angle signal D and vehicle velocity signal V. According to TABLE D of FIG. 12A, the curve representing the gear ratios G will shift to another curve in an arrowed direction as the vehicle velocity V increases.

The outward motion calculating section 21e4 multiplies the outward steering velocity control amount Cf from the outward steering velocity control section 21e1 by the gear ratio G from the gear ratio calculating section 21e3 directly or after suitable modification thereof, to thereby determine an outward steering velocity control amount $C_{svf}$ (=G·Cf).

Similarly, the return motion calculating section 21e5 multiplies the return steering velocity control amount Cr from the return steering velocity control section 21e2 by the gear ratio G from the gear ratio calculating section 21e3 directly or after suitable modification thereof, to thereby determine a return steering velocity control amount $C_{svr}$ (=−G·Cr).

The selector switch 23, having a software-controlled switching function, selects the outward steering velocity control amount $C_{svf}$ when the steering condition detection signal Ss fed from the steering condition detecting section 20a is at the H level indicative of an outward motion of the steering wheel, but selects the return steering velocity control amount $C_{svr}$ when the steering condition detection signal Ss is at the L level indicative of a return motion of the steering wheel. The thus-selected outward or return steering velocity control amount $C_{svf}$ or $C_{svr}$ is fed to the adder 28b of FIG. 5. The adder 28b subtracts the outward or return steering velocity control amount $C_{sv}$, selected in response to the steering condition detection signal Ss from the condition detecting section 20a, from the the motor torque control amount Ct given from the torque control section 21a, to thereby yield a motor control signal Co that is then applied to the feedback control section 19.

The feedback control section 19, including an adder, PID (Proportional, Integral and Derivative) control section, direction switching section and filter section similar to those shown in FIG. 3, so as to feed current I back to modify the motor control signal Co to be suitable for the motor drive 18 to drive the motor 10; for example, the motor control signal Co is applied to the motor drive 18 after being converted to a PWM signal and a rotational direction signal DM. The motor drive 18 comprises an FET bridge circuit as shown in FIG. 2, which generates a motor drive signal Mo on the basis of the PWM signal and rotational direction signal DM and outputs the signal Mo to the motor 10.

To summarize the arrangement of the control unit 27 of FIG. 5, the torque control section 21 gives a target motor torque value Ct by calculating a motor torque control amount Ct1 corresponding to the input torque signal T and vehicle velocity signal V, a motor torque control amount Ct3 corresponding to the input steering angle signal D and vehicle velocity signal V, and a modified gear ratio "KG $^2$dT/dt" obtained by multiplying a differentiated value (dT/dt) of the toque signal T by a coefficient "k" and the square of a gear ratio G. Further, the steering velocity control section 21e selects an outward or return steering velocity control amount Cf or Cr corresponding to the input steering velocity signal SV and vehicle velocity signal V, multiplies the selected steering velocity control amount Cf or Cr by the currently-set gear ratio G, and subtracts the multiplied result Csv from the target motor torque value Ct. With this arrangement, a great modification is effected even for a great gear ratio and the value (Ct−G·Cf) or (Ct+G·Cf) is output for the outward or return motion, respectively, so that a stable target motor control signal Co is constantly given to the feedback control section 19, irrespective of the gear ratio and steering velocity, to drive the motor 10 in a stable manner. Note that the second embodiment also includes a gear ratio control 40 similar to that shown in FIG. 4.

FIG. 13 is a table showing various torque modification directions corresponding to different combinations of steering-angle direction flag values or signs ("+" and "−") Dd, torque direction flag values ("+" and "−") Dt and steering-velocity direction flag values Dsv ("+" and "−"), where control mode A represents an outward motion of the steering wheel while control modes B and C represent a return motion of the steering wheel. Also note that the sign "+" represents the clockwise direction while the sign "−" represents the counterclockwise direction.

For example, when the steering condition detecting section 20a detects the clockwise direction "+", and if the steering-angle direction flag Dd is "+", the torque direction flag Dt is "+" and the steering-velocity direction flag Dsv is "+/−", the torque modification direction is "−" representing an outward motion of the steering wheel. Then, the torque modification value (Ct−Csvf) is given in control mode A which represents an outward motion. If the steering-angle direction flag Dd is "+", the torque direction flag Dt is "−" and the steering-velocity direction flag Dsv is "+", the torque modification direction is "+" representing a slight return motion. Then, the torque modification value (Ct+Csvr) is given in control mode C which represents a slight return motion. Further, if the steering-angle direction flag Dd is "+", the torque direction flag Dt is "−" and the steering-velocity direction flag Dsv "−", the torque modification direction is "−" representing a return motion of the steering wheel. Then, the torque modification value (Ct−Csvf) is given in control mode B which represents a return motion.

Further, when the steering condition detecting section 20a detects the counterclockwise direction "−", and if the steering-angle direction flag Dd is "−" and the torque direction flag Dt, steering-velocity direction flag Dsv and the torque modification direction all take opposite states to the above-mentioned, no change occurs in the control mode.

Figure 10:
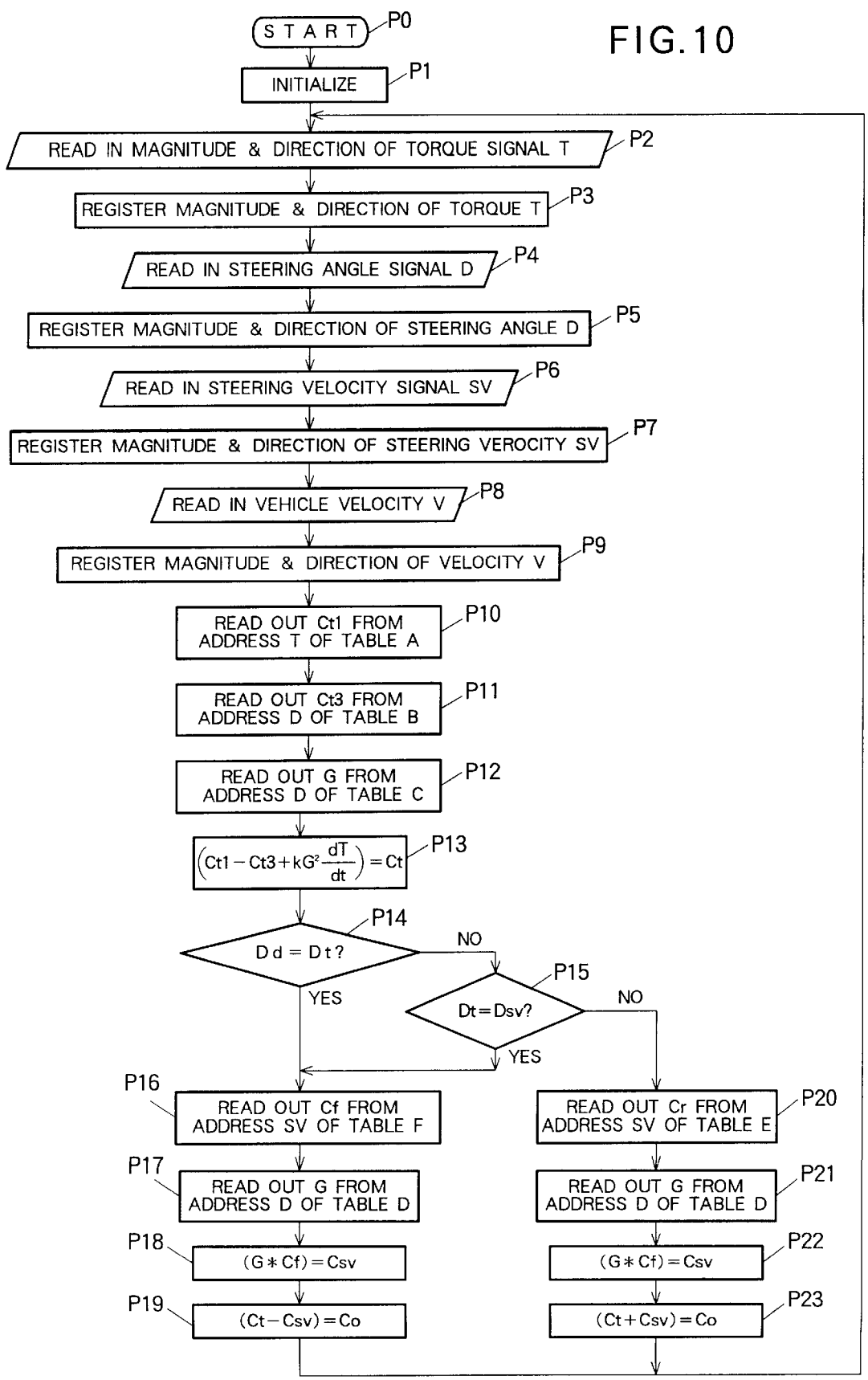
FIG. 10 is a flow chart showing an exemplary sequence of operations carried out by a control unit in the second embodiment of FIG. 5.

FIG. 10 is a flow chart showing an exemplary step sequence of operations carried out by the electronic control unit 27 in the second embodiment of FIG. 5.

In response to turning-ON of an ignition key switch (not shown) of the vehicle, the control unit 27 is activated at step P0. First, at step P1, the control unit 27 sends a control signal, such as a power-on reset signal, to the various components of the electric power steering apparatus for necessary initialization thereof. Then, the control unit 27 reads in a torque signal T indicative of a magnitude and direction of torque detected by the steering torque sensor 12 at next step P2, and registers an absolute magnitude value and direction of the detected torque at following step P3; specifically, the direction is set into the flag Dt.

Subsequently, the control unit 27 reads in a steering angle signal D indicative of a steering angle and direction detected by the steering angle sensor 15 at step P4, and registers an absolute value of the detected steering angle and its direction at following step P5; specifically, the direction is set into the steering-angle direction flag Dd. After that, the control unit 27 reads in a steering velocity signal SV indicative of a steering velocity and direction detected by the steering velocity sensor 14 at step P6, and registers a magnitude value of the detected steering velocity and its direction at following step P7; specifically, the direction is set into the steering-velocity direction flag Dsv. Further, the control unit 27 reads in a vehicle velocity signal V indicative of a vehicle velocity and direction detected by the vehicle velocity sensor 16 at step P8, and registers a magnitude value of the detected vehicle velocity and its direction at following step P9; specifically, the direction is set into a vehicle-velocity direction flag Dv.

Then, at step P10, a particular motor torque control amount Ct1 is read out from address T of table A which is provided in the memory of the torque control section 21a and which has prestored therein various motor torque control amounts Ct1 corresponding to various possible values of torque signal T and vehicle velocity signal V as shown in FIG. 11A. At next step P11, a particular motor torque control amount Ct3 is read out from address D of table B which is provided in the memory of the torque control section 21a and which has prestored therein various motor torque control amounts Ct3 corresponding to various possible steering-angle direction values Dd, absolute values of steering angle Cd and values of vehicle velocity signal V as shown in FIG. 11B. Further, at step P12, a particular gear ratio G is read out from address D of table C which is provided in the memory of the torque control section 21a and which has prestored therein various gear ratios G corresponding to various possible values of steering angle signal D and vehicle velocity signal V as shown in FIG. 11C.

Subsequently, at step P13, a differentiated value (dT/dt) of the torque signal T is multiplied by a coefficient "k" and the square of the gear ratio G obtained at step P12 to provide a modified gear ratio "KG$^2$dT/dt", which is added to a difference between the motor torque control amounts Ct1 and Ct3 obtained at steps P10 and P11. The result "Ct1−Ct3+KG$^2$dT/dt" is output as a target motor torque value Ct.

At step P14, the steering condition detecting section 20a in the control unit 27 compares the steering-angle direction flag Dd and the torque direction flag Dt. Then, via a switching operation of the selector switch 23 in response to a steering condition detection signal Ss given from the steering condition detecting section 20a, a different set of operations is carried out depending on whether the steering-angle direction flag Dd and the torque direction flag Dt match each other (Dd=Dt) or not (Dd≠Dt). Namely, if the direction flags Dd and Dt match each other (Dd=Dt), the control unit 27 judges that there has occurred an outward steering operation and goes to step P16, while if the direction flags Dd and Dt do not match each other (Dd≠Dt), the control unit 27 branches to step P15 to further determine the operation of the steering system.

Namely, at step P15, the steering condition detecting section 20a in the control unit 27 compares the torque direction flag Dt and steering-velocity direction flag Dsv. Then, via a switching operation of the selector switch 23 in response to the steering condition detection signal Ss, a different set of operations is carried out depending on whether the torque direction flag Dt and the steering-velocity direction flag Dsv match each other (Dt=Dsv) or not (Dt≠Dsv). Namely, if the direction flags Dt and Dsv match each other (Dt=Dsv), the control unit 27 judges that there has occurred a return steering operation and goes to step P16, while if the direction flags Dt and Dsv do not match each other (Dt≠Dsv), the control unit 27 judges that there has occurred a slight return steering operation and branches to step P20.

At step P16, a particular outward steering velocity control amount Cf is read out from address SV of table F which is provided in the memory of the steering velocity control section 21e and which has prestored therein various outward steering velocity control amounts Cf corresponding to various possible values of steering velocity signal SV and vehicle velocity signal V as shown in FIG. 12C. At next step P17, a particular gear ratio G is read out from address D of table D which is provided in the memory of the steering velocity control section 21e and which has prestored therein various gear ratios G corresponding to various possible values of steering angle signal D and vehicle velocity signal V as shown in FIG. 12A.

At step P18 following step P17, the read-out outward steering velocity control amount Cf is multiplied by the readout gear ratio G, to output the multiplication result (Cf·G) as a steering velocity control amount $C_{sv}$. Then, a value calculated by subtracting the steering velocity control amount $C_{sv}$ obtained at step P18 from the target motor torque value Ct obtained at step P13 (i.e., Ct−Csv) is output as a target motor control signal Co.

On the other hand, at step P20 following the negative (NO) determination of step P15, a particular return steering velocity control amount Cr is read out from address SV of table E which is provided in the memory of the steering velocity control section 21e and which has prestored therein various return steering velocity control amounts Cr corresponding to various possible values of steering velocity signal SV and vehicle velocity signal V as shown in FIG. 12B. At next step P21, a particular gear ratio G is read out from address D of table D which is provided in the memory of the steering velocity control section 21e and which has prestored therein various gear ratios G corresponding to various possible values of steering angle signal D and vehicle velocity signal V as shown in FIG. 12A.

At step P22 following step P21, the read-out return steering velocity control amount Cr is multiplied by the readout gear ratio G, to output the multiplication result (Cr·G) as a steering velocity control amount $C_{sv}$. Then, a value calculated by adding the target motor torque value Ct obtained at step P13 and the steering velocity control amount $C_{sv}$ obtained at step P22 (i.e., Ct+Csv) is output as a target motor control signal Co.

The steering velocity sensor 14 in the preferred embodiments has ben described as comprising a dc motor, such as a tacho-generator, for detecting a rotating speed of the steering shaft 3; alternatively, the rotating speed of the steering shaft 3 may be calculated using the motor 10. Further, the above-described variable gear ratio mechanism may be of the same construction as disclosed in Japanese Patent Publication No. HEI-4-9708.

In summary, the electric power steering apparatus is characterized primarily in that it includes a gear ratio detector for detecting a gear ratio currently set in the variable gear ratio mechanism and the control unit sets a target motor current on the basis of steering torque detected by the steering torque sensor and the currently-set gear ratio detected by the gear ratio detector. Because a target motor current is thus set which reflects the currently-set gear ratio from the gear ratio detector, the present invention can always change the operating characteristics of the steering system smoothly, in response to every gear ratio change, so as to achieve an improved steering feel free of unsmoothness.

What is claimed is:

1. An electric power steering apparatus for use with an automotive vehicle comprising:

a variable gear ratio mechanism for variably setting a gear ratio defining a pivot angle of steered wheels of the vehicle to a steering angle of a steering wheel of the vehicle;

an electric motor for applying an electric steering assist to a steering system of the vehicle;

a steering torque sensor for detecting steering torque in the steering system;

a control unit for setting a target motor current on the basis of at least the steering torque detected by said steering torque sensor;

a motor drive for driving said motor on the basis of the target motor current set by said control unit; and a gear ratio detector for detecting the gear ratio set by said variable gear ratio mechanism, wherein said control unit sets said target motor current on the basis of the gear ratio detected by said gear ratio detector in addition to the steering torque detected by said steering torque sensor.

* * * * *